(12) United States Patent
Basso et al.

(10) Patent No.: US 7,508,771 B2
(45) Date of Patent: Mar. 24, 2009

(54) METHOD FOR REDUCING LATENCY IN A HOST ETHERNET ADAPTER (HEA)

(75) Inventors: Claude Basso, Raleigh, NC (US); Jean Louis Calvignac, Raleigh, NC (US); Chih-jen Chang, Apex, NC (US); Philippe Damon, Raleigh, NC (US); Natarajan Vaidhyanathan, Carrboro, NC (US); Fabrice Jean Verplanken, La Gaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 11/096,353

(22) Filed: Apr. 1, 2005

(65) Prior Publication Data

US 2006/0221951 A1  Oct. 5, 2006

(51) Int. Cl.
*H04L 12/26* (2006.01)
(52) U.S. Cl. .................................. 370/252; 370/398
(58) Field of Classification Search ................ 370/252, 370/253, 229, 398, 392, 397, 471, 393
See application file for complete search history.

(56) References Cited

U.S. PATENT DOCUMENTS

| | | | |
|---|---|---|---|
| 5,058,110 A | 10/1991 | Beach et al. | |
| 5,430,842 A | 7/1995 | Thompson et al. | |
| 5,752,078 A | 5/1998 | Delp et al. | |
| 6,400,730 B1 | 6/2002 | Latif et al. | |
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 | 1/2004 | Russell et al. | |
| 6,724,769 B1 | 4/2004 | Sang | |
| 6,728,929 B1 | 4/2004 | Luong | |
| 6,735,670 B1 * | 5/2004 | Bronstein et al. | 711/108 |
| 6,751,229 B1 | 6/2004 | Waller et al. | |
| 6,754,662 B1 * | 6/2004 | Li | 707/101 |
| 6,788,697 B1 | 9/2004 | Aweya et al. | |
| 6,822,968 B1 | 11/2004 | Lim | |

(Continued)

FOREIGN PATENT DOCUMENTS

WO  03049488 A1  6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Ricky Ngo
*Assistant Examiner*—Gary Mui
(74) *Attorney, Agent, or Firm*—Sawyer Law Group LLP

(57) ABSTRACT

A method for reducing latency in a host Ethernet adapter (HEA) includes the following. First, the HEA receives a packet with an internet protocol (IP) header and data in the HEA. The HEA parses a connection identifier from the IP header and accesses a negative cache in the HEA to determine if the connection identifier is not in a memory external to the HEA. The HEA applies a default treatment to the packet if the connection identifier is not in the memory, thereby reducing latency by decreasing access to the memory.

6 Claims, 2 Drawing Sheets

U.S. PATENT DOCUMENTS

| | | | |
|---|---|---|---|
| 6,954,463 | B1 | 10/2005 | Ma et al. |
| 6,976,205 | B1 | 12/2005 | Ziai et al. |
| 6,988,235 | B2 | 1/2006 | Brown |
| 7,023,811 | B2 | 4/2006 | Pinto |
| 7,031,304 | B1 | 4/2006 | Arberg et al. |
| 7,098,685 | B1 | 8/2006 | Agrawal et al. |
| 7,124,198 | B2 | 10/2006 | Pinkerton |
| 7,134,796 | B2 | 11/2006 | Anderson |
| 7,164,678 | B2 | 1/2007 | Connor |
| 7,218,632 | B1 | 5/2007 | Bechtolsheim et al. |
| 7,251,704 | B2 | 7/2007 | Solomon |
| 7,260,120 | B2 | 8/2007 | Kang et al. |
| 7,269,661 | B2 | 9/2007 | Ree et al. |
| 7,271,706 | B2 | 9/2007 | Nguyen et al. |
| 7,274,706 | B1 | 9/2007 | Nguyen et al. |
| 7,283,528 | B1 | 10/2007 | Lim et al. |
| 7,292,586 | B2 * | 11/2007 | Dewan et al. ............... 370/401 |
| 7,292,591 | B2 | 11/2007 | Parker et al. |
| 7,295,553 | B2 | 11/2007 | Saitoh |
| 7,308,006 | B1 | 12/2007 | Banerjee et al. |
| 2001/0027496 | A1 | 10/2001 | Boucher et al. |
| 2003/0088689 | A1 | 5/2003 | Alexander et al. |
| 2003/0103499 | A1* | 6/2003 | Davis et al. ............... 370/389 |
| 2004/0022094 | A1 | 2/2004 | Radhakrishnan et al. |
| 2004/0030766 | A1 | 2/2004 | Witkowski |
| 2004/0064590 | A1 | 4/2004 | Starr et al. |
| 2004/0081145 | A1 | 4/2004 | Harrekilde-Peterson et al. |
| 2004/0100952 | A1 | 5/2004 | Boucher et al. |
| 2004/0109465 | A1 | 6/2004 | Kim et al. |
| 2004/0218623 | A1 | 11/2004 | Goldenberg et al. |
| 2005/0076136 | A1 | 4/2005 | Cho et al. |
| 2005/0089031 | A1 | 4/2005 | Krueger |
| 2005/0108611 | A1 | 5/2005 | Vogt |
| 2005/0114663 | A1 | 5/2005 | Cornell et al. |
| 2005/0120160 | A1 | 6/2005 | Plouffe et al. |
| 2005/0149677 | A1 | 7/2005 | Shimada et al. |
| 2005/0256975 | A1 | 11/2005 | Kaniz et al. |
| 2006/0120289 | A1 | 6/2006 | Cunningham |
| 2006/0187928 | A1 | 8/2006 | McGee et al. |
| 2006/0216958 | A1 | 9/2006 | Yee et al. |

OTHER PUBLICATIONS

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10Gbps Ethernet Media Access Controller for a 1Gbps/100Mbps Ethernet, located at www.ip.com, IP.com No. IPCOM000133402D, Jan 25, 2006, 6 pages.

Adolf, Geier, Patent Cooperation Treaty: PCT Notification of transmittal of the Inernational Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Balena, F., "Speed up searched with hash tables," Nov. 13, 2001, DevX.com all pages.

* cited by examiner

METHOD FOR REDUCING LATENCY IN A HOST ETHERNET ADAPTER (HEA)

FIELD OF THE INVENTION

The present invention relates to adapters for parsing Internet packets generally, and specifically to a system and method for reducing latency in a host Ethernet adapter (HEA).

CROSS-REFERENCE TO RELATED APPLICATIONS

The present application is related to the following copending U.S. patent application Ser. Nos.:

U.S. patent application, Ser. No. 11/097,608, entitled "Host Ethernet Adapter for Networking Offload in Server Environment", filed on even date herewith and assigned to the assignee of the present invention.

U.S. patent application, Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application, Ser. No. 11/096,571, entitled "Method and Apparatus for Providing a Network Connection Table", filed on even date herewith and assigned to the assignee of the present invention.

U.S. patent application, Ser. No. 11/097,051, entitled "Network Communications for Operating System Partitions", filed on even date herewith and assigned to the assignee of the present invention.

U.S. patent application, Ser. No. 11/097,652, entitled "Configurable Ports for a Host Ethernet Adapter", filed on even date herewith and assigned to the assignee of the present invention.

U.S. patent application, Ser. No. 11/096,353, entitled "System and Method for a Method for Reducing Latency in a Host Ethernet Adapter (HEA)", filed on even date herewith and assigned to the assignee of the present invention.

U.S. patent application, Ser. No. 11/097,055, (entitled "Method and Apparatus for Blind Checksum and Correction for Network Transmissions", filed on even date herewith and assigned to the assignee of the present invention.

U.S. patent application, Ser. No. 11/096,362, entitled "Method and System for Performing a Packet Header Lookup", filed on even date herewith and assigned to the assignee of the present invention.

U.S. patent application, Ser. No. 11/097,430, entitled "System and Method for Computing a Blind Checksum in a Host Ethernet Adapter (HEA)", filed on even date herewith and assigned to the assignee of the present invention.

BACKGROUND OF THE INVENTION

A computer, or host, connects to a network through an adapter that parses, or separates, each packet received over the network. The adapter may be known as a host Ethernet adapter (HEA). A packet is composed of an Internet protocol (IP) header and some data. The IP header is composed of several fields, such as source address, destination address, ports, protocol, and some transport protocol information. These fields are known as the 5-tuple, or connection identifier (Id), and are used to identify how the packet should be handled.

After parsing out the connection Id, the HEA sends the connection Id to a memory external to the adapter. The external memory may have a lookup table or connection table for looking up the treatment protocol for the packet. One problem with this is that the process of sending the connection Id to the memory and having the memory look up the treatment protocol for each packet is time-consuming, resulting in an undesirable latency for the look up of the treatment protocol for packets in the adapter. Storing the connection table in the adapter is not practical due to the size of the connection table.

Accordingly, what is needed is a system and method for reducing latency in a host Ethernet adapter (HEA). The present invention addresses such a need.

BRIEF SUMMARY OF THE INVENTION

The present invention provides a system and method for reducing latency in a host Ethernet adapter (HEA) including the following. First, the HEA receives a packet with an Internet protocol (IP) header and data in the HEA. The HEA parses a connection identifier from the IP header and accesses a negative cache in the HEA to determine if the connection identifier is not in a memory external to the HEA. The HEA applies a default treatment to the packet if the connection identifier is not in the memory, thereby reducing latency by decreasing access to the memory.

DETAILED DESCRIPTION OF THE INVENTION

The present invention relates to a system and method for reducing latency in a host Ethernet adapter (HEA). The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
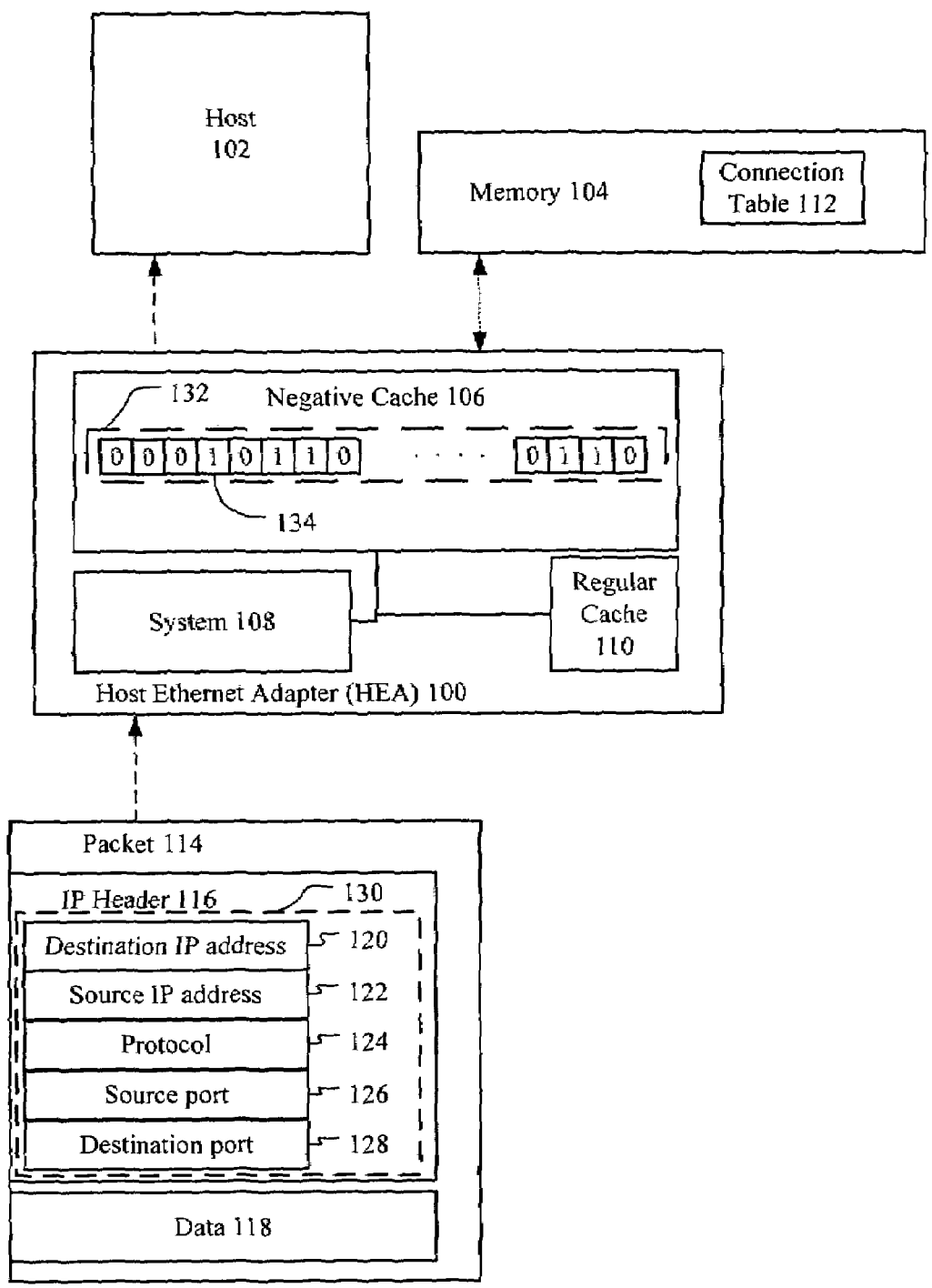
FIG. 1 is a block diagram illustrating a host Ethernet adapter (HEA) according to one embodiment of the invention.

FIG. 1 is a block diagram illustrating a host Ethernet adapter (HEA) 100 connected to a host 102 and a memory 104. The HEA contains a negative cache 106 connected to a system 108 and optionally may include a regular cache 110. The memory 104 includes a connection table 112.

Figure 2:
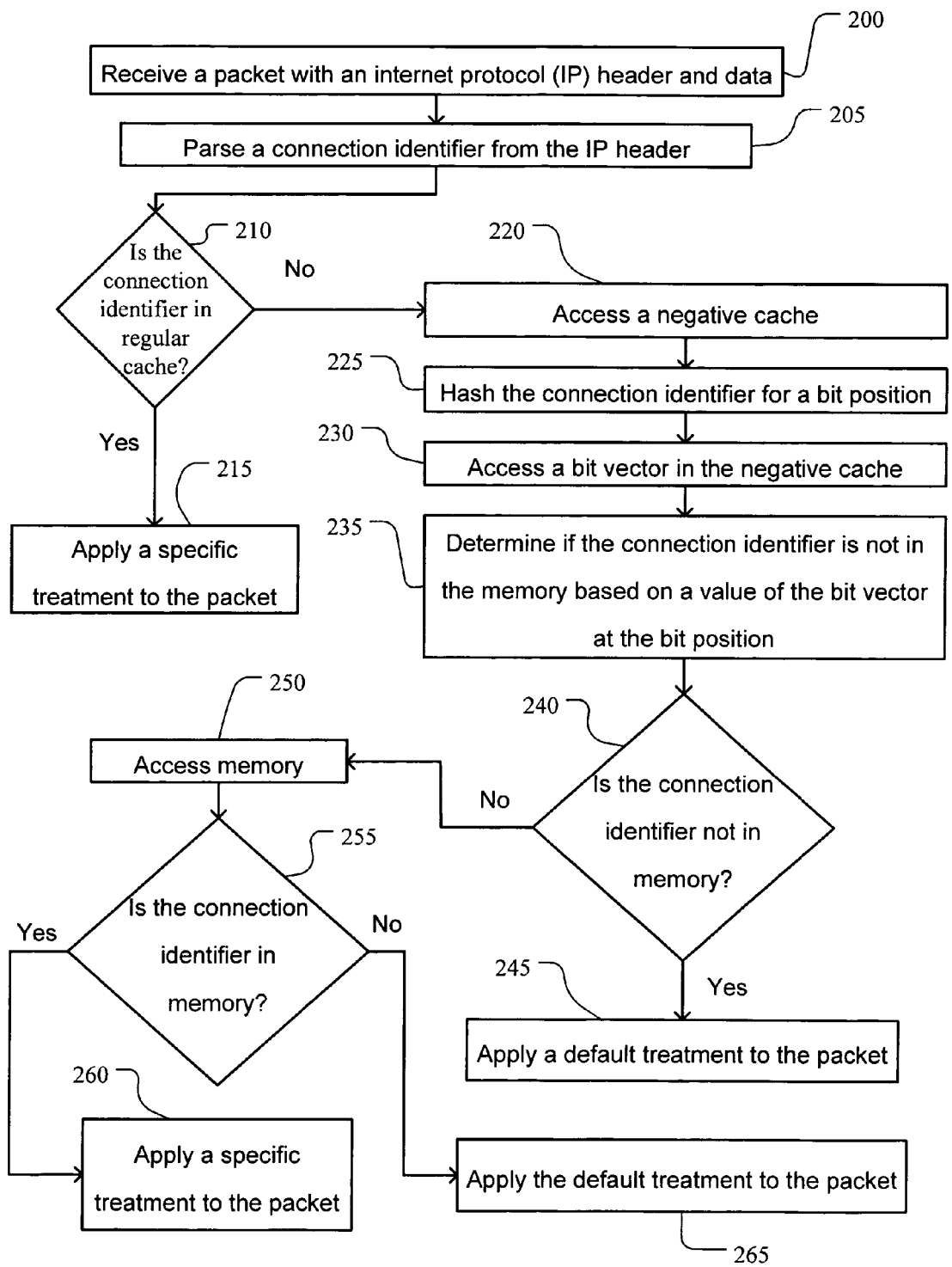
FIG. 2 is a flow diagram illustrating one embodiment of the invention implemented in the diagram of FIG. 1.

FIG. 2 is a flow diagram illustrating one embodiment of the invention implemented in the diagram of FIG. 1. FIGS. 1 and 2 will be discussed in conjunction with one another. For simplicity, reference numerals beginning with '100' will be found in FIG. 1 while reference numerals beginning with '200' will be found in FIG. 2.

In block 200 of FIG. 2, HEA 100 receives a packet 114 with an Internet protocol (IP) header 116 and data 118. The IP header 116 includes a destination IP address 120, a source IP address 122, a protocol 124, a source port 126, and a destination port 128, which are collectively known as a connection identifier (Id) 130. The HEA 100 may receive many packets 114.

In block 205, the system 108 parses the connection Id 130 from the IP header 114. If HEA 100 can determine that the connection Id 130 is stored in either regular cache 110 or connection table 112, then HEA 100 will receive a specific treatment, or set of instructions, for directing packet 114. Many packets 114 fall under a default treatment setting, which means they are all treated alike. Some packets 114 require special handling, and have specific treatments that differ from the default treatment. Some packets 114 may require special handling, but the specific treatment has not been entered into regular cache 110 or connection table 112, so a default treatment is used.

In block 210, the system 108 may determine if the connection Id 130 is in the optional regular cache 110. If the regular cache 110 is not present in HEA 100, this block is skipped. If the connection Id 130 is in the regular cache 110, then the method of treating packet 114 may be looked up and applied in block 215. Sometimes the specific treatment listed in the regular cache 110 is the same as the default treatment had the connection Id 130 not been listed.

Continuing from block 210, if the connection Id 130 is not in the regular cache 110, then in block 220, system 108 accesses the negative cache 106. The negative cache 106 includes a one-bit wide bit vector 132 lacking collision resolution, with any number of entries. The HEA 100 has better performance with a smaller bit vector 132.

In block 225, negative cache 106 hashes the connection Id 130 with a one-bit wide hash table (not shown) for a bit position. After hashing connection Id 130, a bit position will result, for example bit position four. Then, in block 230, negative cache 106 accesses the bit vector 132 and in block 235 determines if the connection Id 130 is not in the memory 104 based on the value of the bit vector 132 at the bit position (for example, bit position four).

At this time, an explanation of setting the bit vector 132 will aid in understanding the invention. The bit vector 132 is initially set to a predetermined value, for example all zero to indicate that no entries are in the memory 104. When a specific treatment for a connection Id 130 is entered into memory 104, the hash table of negative cache 106 (not shown) is used to hash the connection Id 130 being stored, resulting in a bit position. That bit position represents the connection Id 130, and flipping the value from the default setting indicates the possible presence of a specific treatment for the connection Id 130 in the memory 104. Negative cache 106 can only negatively determine the presence of a connection Id 130 in the memory 104 because the hash table (not shown) and bit vector 132 lack collision resolution, meaning some connection Ids 130 will have the same hash bit position.

For example when storing in memory 104 the specific treatment for a connection Id 130, assume a bit vector 132 with all zeros. A hash of the connection Id 130 results in a bit position, for example bit position four, which currently has a value of zero (all the positions are currently zero). Bit position four is then switched in bit vector 132, for example from zero to one. However, other connection Ids 130, which do not receive the same treatment as the first, may also hash to position four. By changing bit position four from zero to one, the negative cache 106 establishes that at least one of possibly several connection Ids 130 with a hash value to bit position four are in the memory 104. Only by checking the memory 104 will HEA 100 be able to determine if a particular connection Id 130 is in the memory 104. However, if the value is zero, none of the connection Ids with a hash value to that bit position are in the memory 104, and the memory 104 does not need to be checked. This is why cache 106 is a 'negative' cache.

Continuing after block 235, in block 240 HEA 100 determines if the connection Id 130 is not in the memory 104. As explained above, only the absence of the connection Id 130 from the memory 130 can be answered with authority, due to the lack of collision resolution in the bit vector 132.

If the connection Id 130 is not in the memory 104, then in block 245 the HEA 100 applies a default treatment to the packet 114. The amount of time required to check the bit vector 132 is less than the amount of time required to check the connection table 112 in the memory 104, so avoiding access to the memory 104 decreases latency in the HEA 100.

In the earlier example, connection Id 130 hashed to bit position four. In bit vector 132, bit position four 134 is one, so the absence of the connection Id 130 from memory 104 cannot be established without actually checking the memory 104. Therefore, in block 250, HEA 100 accesses the memory 104. The memory 104 may access connection table 112 to determine if the connection Id 130 is present. If the connection Id 130 is present, the treatment is sent to HEA 100 and in block 260 the HEA 100 applies a specific treatment to the packet 114.

If the connection Id 130 is not present in the connection table 112, then in block 265 the HEA 100 applies the default treatment to the packet 114. By properly identify which packets 114 should be given a default treatment and which have a specific treatment, the efficiency of HEA 100 increases.

After parsing, filtering and performing other tasks on the packet 114, HEA 100 sends the data 118 on to host 102.

According to the method and system disclosed herein, the present invention discloses a system and method for reducing latency in a HEA. One skilled in the art will recognize that the particular standards used are exemplary, and any bandwidth-limited network may apply the invention in the above manner. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for reducing latency in a host Ethernet adapter (HEA) comprising:
   receiving a packet with an internet protocol (IP) header and data;
   parsing a connection identifier from the IP header;
   accessing a negative cache in the HEA to determine if the connection identifier is not in a memory external to the HEA, the accessing a negative cache in the HEA further comprising:
   hashing the connection identifier for a bit position;
   accessing a bit vector in the HEA; and
   determining if the connection identifier is not in the memory based on a value of the bit vector at the bit position; and
   applying a default treatment to the packet if the connection identifier is not in the memory, thereby reducing latency by decreasing access to the memory.

2. The method of claim 1 further comprising:
   determining if the connection identifier is in a regular cache in the HEA; and
   applying a specific treatment to the packet if the connection identifier is in the regular cache.

3. The method of claim 1, further comprising:
   determining if the connection identifier is in the memory;
   applying a specific treatment to the packet if the connection identifier is in the memory; and
   applying the default treatment to the packet if the connection identifier is not in the memory.

4. The method of claim 1, a value of zero in bit vector at the bit position indicating that the connection identifier is not in the memory.

5. The method of claim 1 wherein the negative cache is a one-bite wide hash table lacking collision resolution.

6. The method of claim 1 wherein the connection identifier includes a protocol, a source Internet protocol (IP) address, a desitination IP address, a source port, and a destination port.

* * * * *